United States Patent
Kramer et al.

(10) Patent No.: US 9,669,875 B2
(45) Date of Patent: Jun. 6, 2017

(54) DEVICE FOR GENERATING AN IMPULSE ACTING ON A VEHICLE IN A TRANSVERSE DIRECTION OF THE VEHICLE

(71) Applicant: AUDI AG, Ingolstadt (DE)

(72) Inventors: Tobias Kramer, Stammham (DE); Stefan Rugies, Ingolstadt (DE); Florian Bartl, Bergheim (DE)

(73) Assignee: AUDI AG, Ingolstadt (DE)

( * ) Notice: Subject to any disclaimer, the term of this patent is extended or adjusted under 35 U.S.C. 154(b) by 7 days.

(21) Appl. No.: 14/890,096

(22) PCT Filed: Apr. 12, 2014

(86) PCT No.: PCT/EP2014/000980
§ 371 (c)(1),
(2) Date: Nov. 9, 2015

(87) PCT Pub. No.: WO2014/180528
PCT Pub. Date: Nov. 13, 2014

(65) Prior Publication Data
US 2016/0107697 A1    Apr. 21, 2016

(30) Foreign Application Priority Data
May 10, 2013  (DE) .................. 10 2013 007 981

(51) Int. Cl.
*B62D 21/15*    (2006.01)
*B60R 19/34*    (2006.01)

(52) U.S. Cl.
CPC ............ *B62D 21/152* (2013.01); *B60R 19/34* (2013.01)

(58) Field of Classification Search
CPC ........ B62D 21/152; B62D 21/15; B60R 19/34
See application file for complete search history.

(56) References Cited

U.S. PATENT DOCUMENTS 8,152,224 B2    4/2012    Faruque et al.
9,120,506 B2    9/2015    Isakiewitsch et al.
(Continued)

FOREIGN PATENT DOCUMENTS

CN    102076530 A    5/2011
CN    103010133 A    4/2013
(Continued)

OTHER PUBLICATIONS

International Search Report issued by the European Patent Office in International Application PCT/EP2014/000980.
(Continued)

*Primary Examiner* — Glenn Dayoan
*Assistant Examiner* — Melissa A Black
(74) *Attorney, Agent, or Firm* — Henry M. Feiereisen LLC

(57) ABSTRACT

A device for generating an impulse acting on a vehicle in a transverse direction of the vehicle, resulting from energy released in an offset impact of the vehicle against an obstacle, includes a compression-resistant beam extending in the transverse direction, a support member for attaching the beam in a rest position to a subframe or a body structure of the vehicle, an activator for moving the beam substantially in the transverse direction in the event of an accident, and a coupling device which cooperates is operatively connected, at least during movement of the beam in the transverse direction, with a drive unit or aggregate and deflects the drive unit relative to the vehicle's body in the transverse direction at least in the region of the operative connection.

11 Claims, 5 Drawing Sheets

(56) References Cited

U.S. PATENT DOCUMENTS

| | | |
|---|---|---|
| 2005/0024210 A1 | 2/2005 | Maki |
| 2009/0045426 A1 | 2/2009 | Fehrer et al. |
| 2012/0248820 A1 | 10/2012 | Yasui et al. |
| 2013/0328334 A1 | 12/2013 | Hoiss et al. |
| 2014/0145423 A1 | 5/2014 | Isakiewitsch et al. |

FOREIGN PATENT DOCUMENTS

| | | |
|---|---|---|
| DE | 43 18 260 | 12/1993 |
| DE | 43 13 785 | 11/1994 |
| DE | 101 13 098 | 9/2002 |
| DE | 102004036322 | 3/2005 |
| DE | 102007023392 | 11/2008 |
| DE | 102010031089 | 1/2012 |
| EP | 2 015 372 | 1/2009 |
| JP | H06-29920 | 4/1994 |
| WO | WO 2012/110529 | 8/2012 |

OTHER PUBLICATIONS

Chinese Search Report issued on Aug. 3, 2016 with respect to counterpart Chinese patent application 201480026265.7.
Translation of Chinese Search Report issued on Aug. 3, 2016 with respect to counterpart Chinese patent application 201480026265.7.

DEVICE FOR GENERATING AN IMPULSE ACTING ON A VEHICLE IN A TRANSVERSE DIRECTION OF THE VEHICLE

CROSS-REFERENCES TO RELATED APPLICATIONS

This application is the U.S. National Stage of International Application No. PCT/EP2014/000980, filed Apr. 12, 2014, which designated the United States and has been published as International Publication No. WO 2014/180528 and which claims the priority of German Patent Application, Serial No. 10 2013 007 981.0, filed May 10, 2013, pursuant to 35 U.S.C. 119(a)-(d).

BACKGROUND OF THE INVENTION

The invention relates to a device for generating an impulse acting on a vehicle in a transverse direction of the vehicle, as a result of energy released during an impact of the vehicle against an obstacle.

To enhance the safety of modern motor vehicles, major efforts are made by the automobile manufacturers to meet increasingly demanding criteria of so-called crash tests, in particular of so-called offset crash tests. Here, a trend can be seen that the overlap upon impact between the obstacle and the vehicle becomes increasingly smaller, so that existing longitudinal rail structures of a vehicle body with currently required overlaps of only 25% as measured from the outside of the vehicle facing the obstacle without side mirrors are usually no longer directly involved in the collision and thus are no longer effective as a catch element for the impact energy. Currently, the so-called "small overlap test" of the US Institute for Accident Research IIHS forms such a loading combination.

Primarily in vehicles with longitudinally installed motor/drive unit, this crash test has the risk of so-called "entanglement", "catching" or "blocking". Entanglement, catching or blocking occurs because for providing adequate wheel well sizes, the longitudinal rails of a vehicle body cannot be moved outwards arbitrarily far. In the region e.g. in front of a front wheel outside of the longitudinal rail (front, right or left "vehicle corner"), the energy released during the impact in a crash test with little overlap cannot be transferred directly to the designated energy-absorbing structures, e.g. the vehicle's longitudinal rail. Such a vehicle moves in such a crash test following the impact toward the obstacle frontally almost unchanged, whereby the front wheel facing the obstacle hits the obstacle frontally, and is inadvertently pushed by the impact into the passenger compartment. The wheel suspensions and the wheel itself are hereby not suited to absorb the released impact energy.

It is known from WO 20121110529 to introduce parts of the impact energy into longitudinal rails of a vehicle body by way of cantilever beams and support structures.

It is known from DE 10 2004 036 322 A11 to provide deflector structures, at which the vehicle should not only slide off in the event of impact with very little overlap so as to cause a lateral displacement of the vehicle and preventing entanglement.

It is known from EP 53 72 201 to introduce forces that occur during a crash with small overlap into the A-pillar of a vehicle body via a support disposed above the wheel.

It is known from U.S. Pat. No. 8,152,224 to provide, in addition to the longitudinal rails arranged farther down in the vehicle, upper longitudinal rails having a repellent contour, so as to ensure a deflection or a lateral displacement of the vehicle.

Furthermore, it is known from US 2012/0248820 A1 to intentionally deform a longitudinal rail in the event of an impact toward the vehicle center by way of a deformation strut and to bring the deformed longitudinal rail section in contact with the drive unit, whenever possible, so as to introduce the impact energy into the drive unit.

SUMMARY OF THE INVENTION

It is an object of the invention to significantly improve the performance of vehicle body structures, in particular for impact tests with low overlap. In particular, this relates to impact tests where the obstacle makes contact with the vehicle outside an impact-energy-compensating structure.

It is another object of the invention to improve the vehicle or the vehicle structure to the effect that the vehicle in the event of an impact onto an obstacle with a small overlap experiences an impulse in the vehicle's transverse direction and thereby experiences an offset in the vehicle's transverse direction during the impact, thus reducing the damage to the vehicle or the forces acting on the occupants.

These objects are attained with a device for generating an impulse onto a vehicle in a vehicle's transverse direction (y) as a result of released energy during an offset collision of the vehicle with an obstacle, wherein the device has at least one rigid compression-resistant beam extending in the vehicle's transverse direction (y), at least one support member for attaching the beam in its rest position to a subframe) or to a body structure of the vehicle, at least one actuator for displacement of the beam in the event of an accident substantially in the vehicle's transverse direction (y), and at least one coupling device, which cooperates or is operatively connected with an aggregate at least in the event of displacement of the beam in the vehicle's transverse direction (y) and which deflects the aggregate at least in the region of the operative connection relative to the body of the vehicle in the vehicle's transverse direction (y).

The inventive idea is based on the idea that the impulse in the vehicle's transverse direction should be introduced directly into the center of gravity of the unit, before entanglement occurs. Due to the movement of the unit, the entire vehicle is then also deflected in the transverse direction, i.e. away from the obstacle, since it transfers to the cell its motion impulse via the conventional unit mount and/or through contact with body structures on the side facing away from the obstacle. This can be implemented with the invention in that the vehicle will no longer move directly toward the obstacle in the event of an impact, but is at least partially directed away from the obstacle, making entanglement less likely or at least reducing the severity of the entanglement. According to the invention, vehicle body structures that are not actually involved in the impact, i.e. that are located within the range of impact, are used for energy absorption.

This is achieved with a device, wherein a rigid beam constructed to be compressible in the vehicle's transverse direction extends substantially in the vehicle's transverse direction. "Substantially in the vehicle's transverse direction" means that the beam does not necessarily need to extend geometrically exact in the vehicle's transverse direction, but that its main extent is at least largely in the vehicle's transverse direction.

The device further includes a support member for attaching the beam on the vehicle. The attachment can preferably be carried out on a subframe (assembly frame). The beam can also be attached/secured of on body structures, for example longitudinal rails. The device further includes at least one actuator for displacing the beam in the event of an accident substantially in a vehicle's transverse direction (y-direction). The actuator ensures that, the beam is displaced during the impact by forces occurring in the vehicle's transverse direction.

The device furthermore has a coupling device which, at least in the event of a displacement of the beam in the vehicle's transverse direction (Y-direction), cooperates with or is operative connected with a drive unit or any other aggregate of the vehicle, and deflects the drive unit or the other aggregate in the vehicle's transverse direction relative to the body of the vehicle at least in the region of the coupling.

"Aggregate/drive unit" in the context of the invention refers to any heavy, especially block-like structure of a vehicle, which is suitable due to its mass to not only shift the entire vehicle insignificantly upon introduction of an impulse. For example, such aggregates may be gear units, electric motors, batteries or the like.

With the invention, the deflection of a relatively heavy block-like unit of the vehicle makes it possible to impose on the vehicle an effective lateral displacement, so that the vehicle is deflected before the obstacle reaches the wheel disposed behind the device in the direction of impact.

With the invention, damage to the vehicle can thus be reduced in a frontal impact, especially in an offset frontal impact. The proposed device is characterized by low production costs and is in particular suitable—as described below—to operate within the framework of functional integration in the event of an accident as a so-called impulse cross beam for introducing an impulse into the aggregate and to operate in normal operation of the vehicle as torque cross beam.

In a preferred embodiment of the invention, the support member is designed for articulation about a vehicle's vertical axis (z-axis) or is less deformation-resistant about the vehicle's vertical axis (z-axis) than about the other vehicle axes (x-axis or y-axis). This allows in particular an easy deflection in the event of an accident, so that a defined displacement of the beam in the vehicle's transverse direction is more easily achievable.

According to another preferred embodiment, the support member is constructed as an articulated device, or as a deformation component or as a deformation assembly.

This optionally allows the coupling device to cooperate with the drive unit in the region of a spatial axis (x-axis, y-axis or z-axis) through the drive unit's center of gravity, wherein a translational displacement of the drive unit relative to the vehicle can be achieved by introducing the impulse. This prevents tilting moments, which could reduce the attainable displacement of the vehicle in the vehicle's transverse direction.

To achieve functional integration, the drive unit may optionally be supported in the z-direction by way of the coupling device and the beam, so that the beam acts as a torque cross beam for supporting moments about the vehicle's transverse axis.

The actuator of the device is advantageously arranged, when viewed in the vehicle's transverse direction, at least partially outside a longitudinal rail and extends at least so far outward that in the event of a collision the beam can be reliably displaced with the actuator in the vehicle's transverse direction (y-direction).

When viewed in the direction of impact, it is advantageous when the actuators or, if these are formed integrally with the beam, the beam at least partially covers those wheels that are arranged farther downstream in the direction of impact. The beam together with the actuators is advantageously arranged in the direction of impact so far in front of a wheel that tends to get entangled, that before the obstacle hits the wheel, the aggregate has already been deflected of relative to the vehicle body and an impulse has already been transferred to the entire vehicle and the vehicle has been displaced laterally away from the obstacle.

The device according to the invention is suitable to be arranged in the region of a vehicle front as well as in the region of a vehicle rear.

Additional advantageous features can be found in the dependent claims or the following detailed description of the figures.

BRIEF DESCRIPTION OF THE DRAWING

The invention will now be described in more detail with reference to exemplary embodiments and the drawing, which shows in.

DETAILED DESCRIPTION OF PREFERRED EMBODIMENTS

Figure 1:
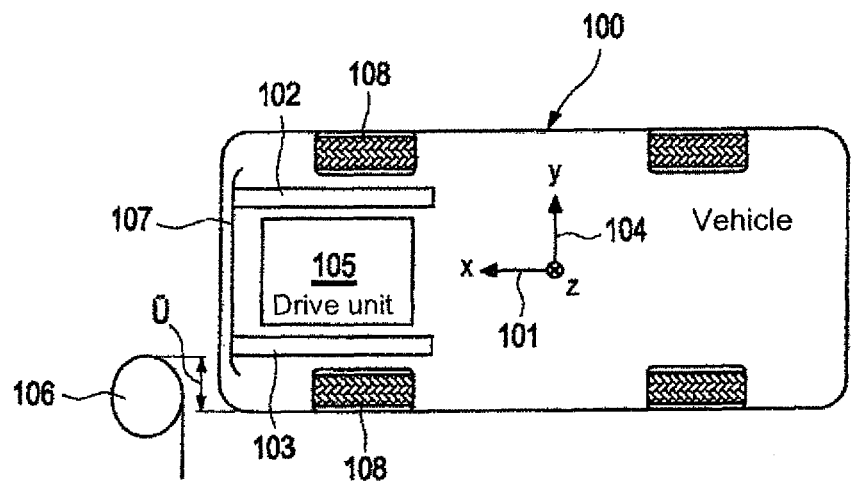
FIG. 1 schematically a plan view of a vehicle according to the prior art before an impact on an obstacle arranged with an offset to the vehicle.
Figure 2:
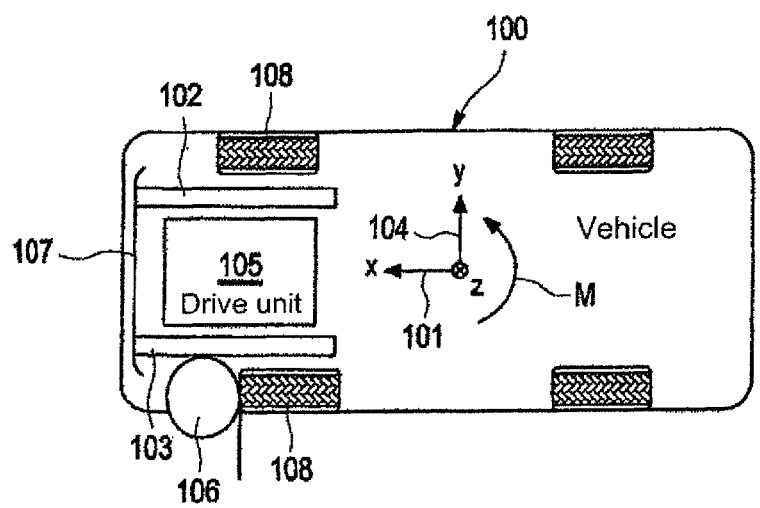
FIG. 2 the situation of FIG. 1 after the impact, wherein the obstacle has already displaced the front wheel of the vehicle.

As an introduction, the accident event will be explained with reference to FIGS. 1 and 2 for a vehicle according to the prior art. A vehicle 100 has two longitudinal rails 102 and 103 in the direction of travel 101. For example, a drive aggregate 105 is arranged between the longitudinal rails 102 and 103, as viewed in the vehicle's transverse direction 104. The vehicle 100 moves in direction of travel 101 toward an obstacle 106, which has for example an overlap Ü amounting to only 25%. The vehicle typically includes also a bumper cross beam 107.

In the event of an accident with a vehicle 100 according to the prior art (see FIG. 2), the obstacle 106 strikes the longitudinal rails 102, 103, which usually constitute the essential elements to dissipate energy from the impact energy in the event of an accident either not at all or only to an insignificant degree. The obstacle 106 comes in contact with a front wheel 108 which then "penetrates" into the vehicle body virtually unimpeded. The front wheel. 108 is not able to absorb energy to a sufficient degree and is usually pushed relatively far into the vehicle interior while deforming a wheel housing of the vehicle 100. This causes the vehicle to be caught on the severely offset obstacle. Due to the impact, the vehicle usually experiences a torque M in the direction of the arrow shown in FIG. 2, thereby further enhancing entanglement.

Conversely, the progression of an accident is, as described below in an overview, influenced positively in a vehicle 1 that is equipped with a device 2 according to the invention for generating an impulse onto the vehicle 1 in the vehicle's transverse direction y. Upon impact of the vehicle 1 on the obstacle 106, the obstacle 106 comes into contact with the device 2 (contact point K). The device 2 thereby undergoes a displacement relative to the vehicle 1 predominantly in the vehicle's transverse direction (y-direction). The device 2 hereby operatively engages with the drive unit 105 via the coupling point 15, whereby the drive unit 105 is entrained by a certain distance in the vehicle's transverse direction 104 (y-direction). The drive unit 105 thereby comes into contact with a relatively stiff region of the vehicle body on the side opposite the crash side (impact point K), whereby the impact energy is introduced by way of the device 2 and the aggregate 105 into massive and sturdy load-bearing body structures, such as the longitudinal rail 102. In this way, at least a portion of the impact energy can be redirected such that the vehicle experiences in its front region or, more generally, in the collision region, an impulse in the vehicle's transverse direction, causing the vehicle to be moved away from the obstacle 106 along a distance S—at least in the front region of the vehicle. This offset of the vehicle 1 has the effect of minimizing the tendency for interlocking and also optionally makes it easier for the front wheel 108 of the vehicle to slide off the obstacle 106. In this way, in such an accident situation with only slight overlap, the damage to the vehicle 1 can be significantly minimized and the load on the passenger compartment can likewise be reduced.

Figure 3:
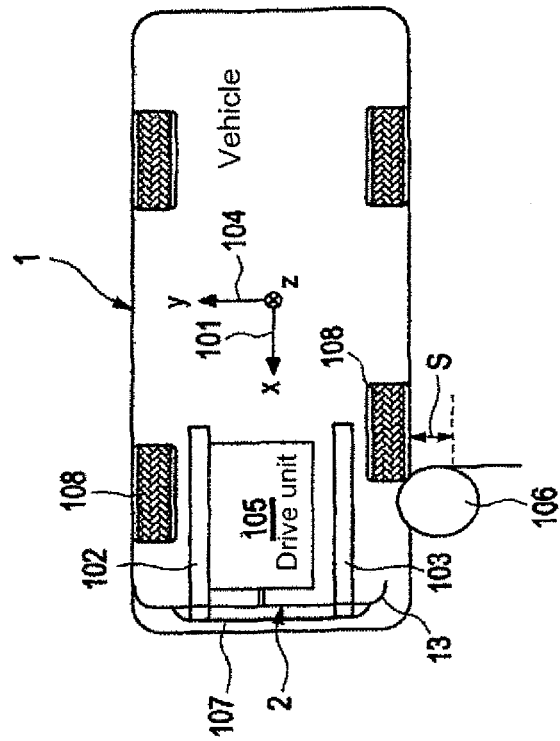
FIG. 3 the impact of a vehicle on an obstacle arranged with an offset, wherein the vehicle includes the device according to the invention.
Figure 4:
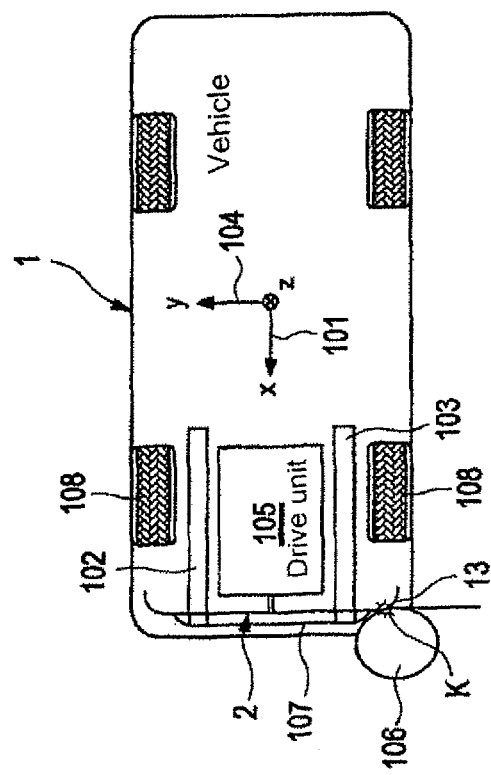
FIG. 4 the situation according to FIG. 3 after the collision, wherein the vehicle having the invention has undergone a lateral displacement.
Figure 5:
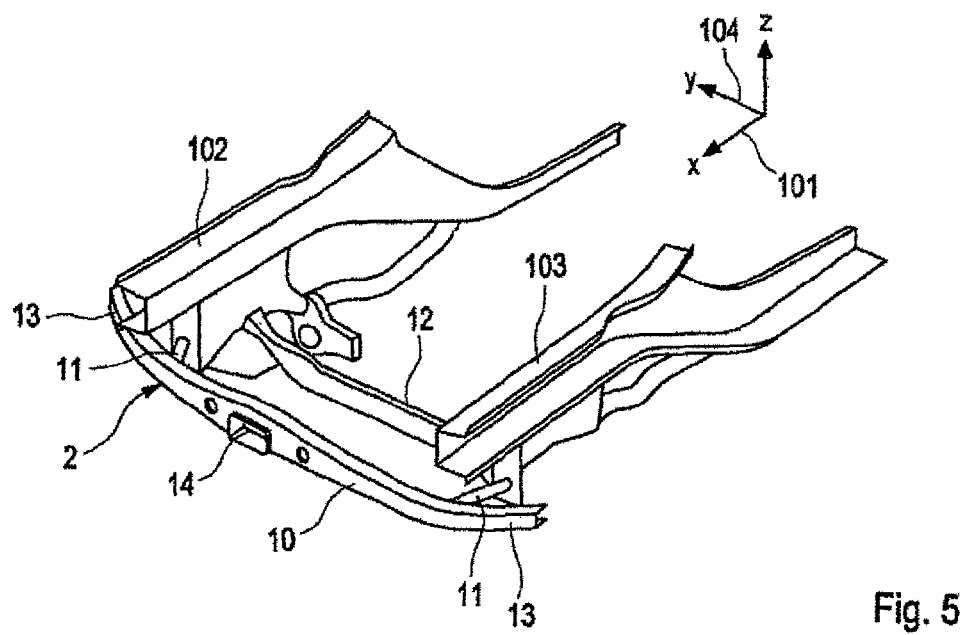
FIG. 5 schematically, the device of the invention in a perspective view of a portion of a body structure.
Figure 6:
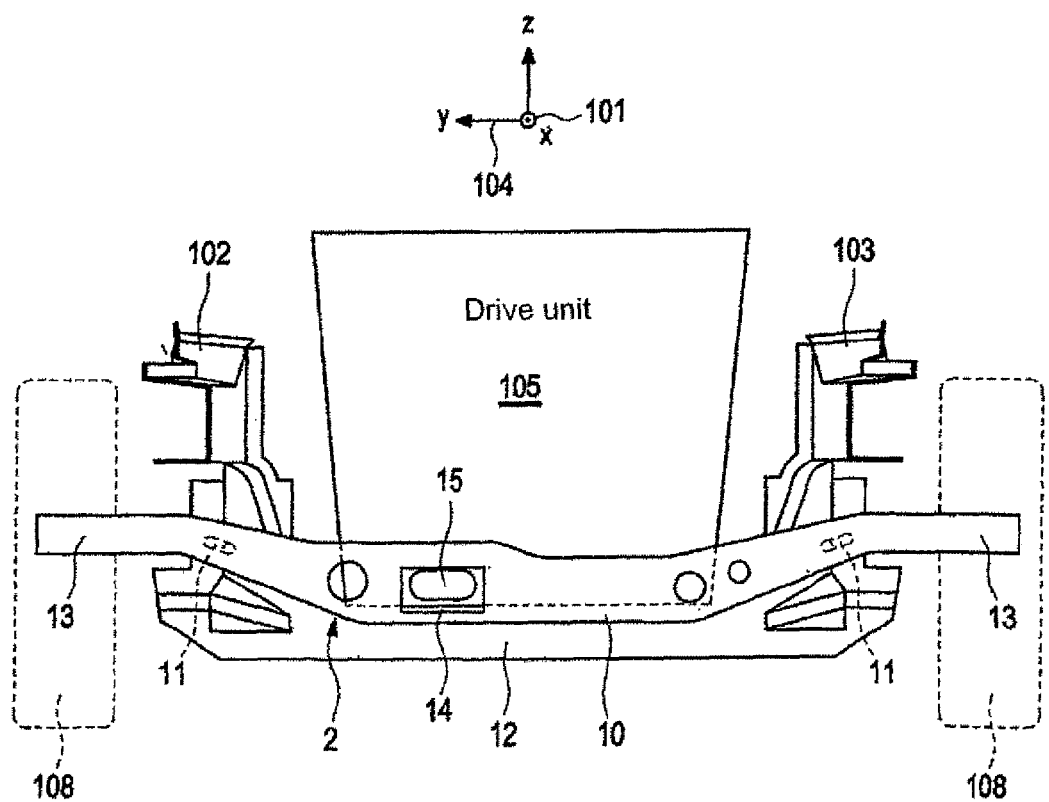
FIG. 6 the device according to the invention in accordance with FIG. 5 in a front view, with a schematically illustrated aggregate.
Figure 7:
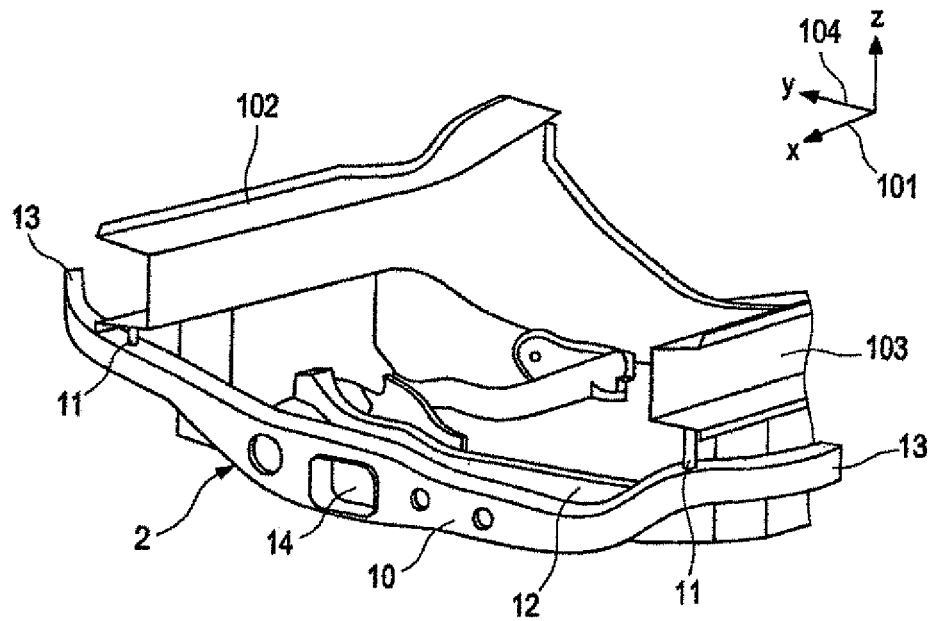
FIG. 7 an enlarged view of the device according to the invention with schematically illustrated displacement devices.

To attain this effect, as was explained with reference to FIGS. 3 and 4, a device according to the invention—which will be explained below with reference to the FIGS. 5 to 7—has at least one rigid compression-resistant beam 10 extending substantially in the vehicle's transverse direction y. The beam 10 is attached by way of support members 11 in a rest position, for example, on a subframe 12 of the vehicle 1.

The device 2 according to the invention has furthermore an actuator 13, which is used to displace the beam 10 in the event of an accident substantially in the vehicle's transverse direction (y). The actuator 13 (see also FIG. 3) protrudes in the normal state (i.e., before the accident), as viewed in the vehicle's transverse direction, into the expected contact region with the obstacle 106. The actuator 13 is also arranged in the direction of travel 101 as far as possible in front of the part of the vehicle at risk of entanglement, e.g. the front wheel 108. This ensures that the device 2 according to the invention reliably makes contact with the obstacle 106 in the event of an accident. Furthermore, the actuator according to the illustrated embodiment is designed like a slide rail or cheek, which is arranged with a rearward downward slope in relation to the beam 10 in the vehicle longitudinal direction so as to enable the obstacle 106 to slide across a front side of the actuator 13 facing the obstacle 106. The actuator 13 is preferably rigidly connected to the beam 10, so that the beam 10 can be displaced, i.e. operated, in the event of an accident, i.e. when the actuator 13 makes contact with the obstacle 106, in the vehicle's transverse direction.

Furthermore, the device 2 according to the invention has a coupling device 14, which cooperates with or is operatively connected with the aggregate 105 (shown schematically in FIG. 6) at least in the event of the displacement of the beam 10 in the vehicle's transverse direction (y). The coupling device 14 includes, for example, a cup-shaped recess disposed in the beam 10, in which a pin or a different type of projection 15 engages. Preferably, some play between the projection 15 and the coupling device 14 is provided in the vehicle's transverse direction y in the normal state so as to prevent movement of the aggregate in the vehicle's transverse direction y from being inadvertently transmitted to the device according to the invention.

In the event of an accident, the coupling device 14 is in positive contact with the projection 15 (i.e., in operative positive-locking connection) and deflects the aggregate 105 somewhat in the vehicle's transverse direction y. In the event of an accident, the aggregate 105 is hereby moved, for example, toward one of the longitudinal rails 102 until the aggregate 105 comes into contact with this longitudinal rail 102 or with a similar body structure.

The impulse that was transferred to the aggregate 105 via the device according to the invention is thereby transmitted over a large area to a specially designed energy-dissipating body structure, for example the longitudinal rail 102. The relatively heavy aggregate 105 transmits this impulse onward to the vehicle body, thereby causing a lateral offset of the vehicle 1 and concurrently reducing the tendency of the vehicle 1 for entanglement.

This becomes possible because according to the invention the impulse generated in the vehicle's transverse direction during the collision is introduced into the center of gravity of the aggregate 105 or into the aggregate 105, before entanglement or interlocking occurs. The impulse transfer from the aggregate 105 to the stiffer body structures occurs preferably already at a time before the obstacle collides with the front wheel, so that the vehicle is already offset away from the obstacle as early as possible. With this measure, for example, the vehicle has enough time to move away laterally from the obstacle and thus reduce the probability for entanglement.

The actuator 13 protrudes, as viewed in the vehicle's transverse direction, laterally beyond the longitudinal rails 102, 103 and at least partially covers the front wheel(s) 108. The support member 11 is preferably designed for easy deformation or articulation in response to forces acting on the beam 10 in the vehicle's transverse direction, so that a displacement of the beam 10 in the vehicle's transverse direction y requires only relatively small forces. The support member 11 is preferably designed to be stiff for forces acting on the beam in the vehicle's vertical direction (z-direction). In this way, the beam 10 of the device 2 according to the invention can be used in normal situations (i.e. in the absence of an accident) as transverse torque support for receiving aggregate forces in the z direction.

In another embodiment of the device 2 according to the invention, the beam 10 is attached on subframe 12 by way of struts 16. The attachment to the subframe 12 may be rigid or articulated, in particular articulated about the vehicle's vertical axis (z-axis). The device 2 is preferably stiffened In the transition region between the beam 10 and the actuator 13 by way of a strut 17 or a gusset plate 18, so as to prevent—as much as possible—the portion of the device 2 that is cantilevered outside of the longitudinal rail 102 (this relates particularly to the actuator 13) from being bent. The aim is here to construct the device 2, in particular the beam 10 and the actuator 13, as rigidly as possible, so that the beam 10 is reliably displaced in the vehicle's transverse direction (y-direction) in the event of an accident when the vehicle collides with the obstacle 106 or the device 2 makes contact with the obstacle 106.

Figure 8:
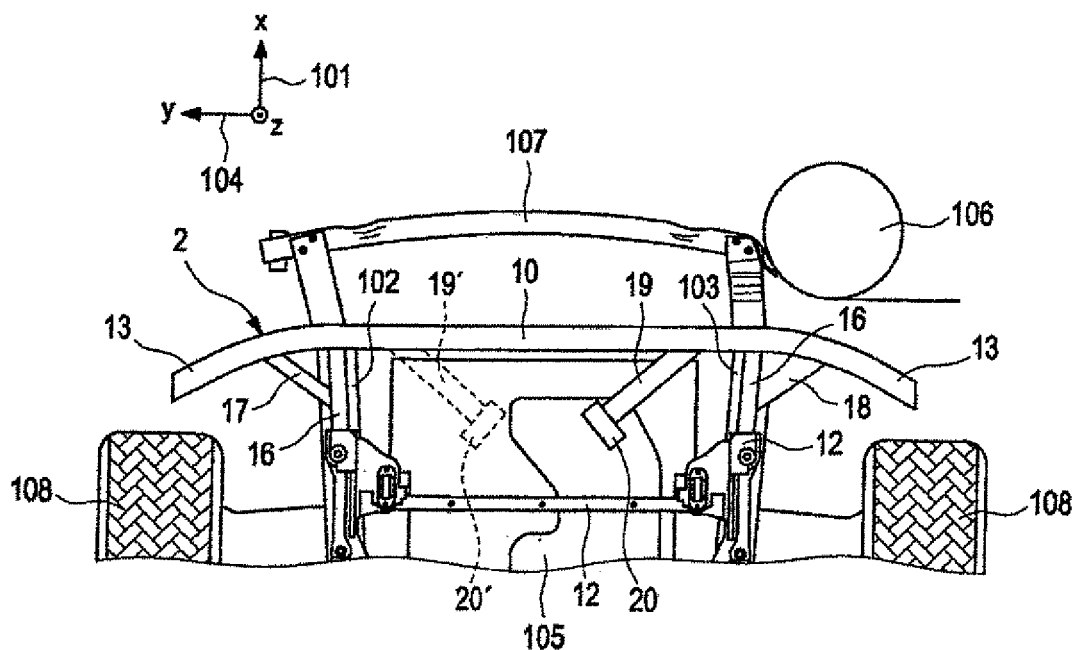
FIG. 8 schematically, a bottom view of a vehicle having the device according to the invention, and FIG. 9 an embodiment of a support member in a schematic view.

In the embodiment of FIG. 8, the impulse thus transferred from the obstacle 106 to the device 2 is introduced into the aggregate, in particular the drive unit 105, by way of a support 19 and a suitable force introduction device 20. As illustrated in FIG. 8 with solid lines, the support 19 may be formed as both a tension and a compression strut in order to transmit forces to the aggregate 105 in both directions. Nevertheless, for example, two supports 19, 19' may be present (19' is shown in FIG. 8 with dashed lines), wherein the support 19' introduces the generated forces into the aggregate 105 via a correspondingly designed force introduction device 20'. In this case, the supports 19, 19' may be constructed only as compression supports in order to be able to transfer forces to the aggregate 105 via the beam 10 in both directions (i.e. in the two vehicles transverse directions).

Figure 9:
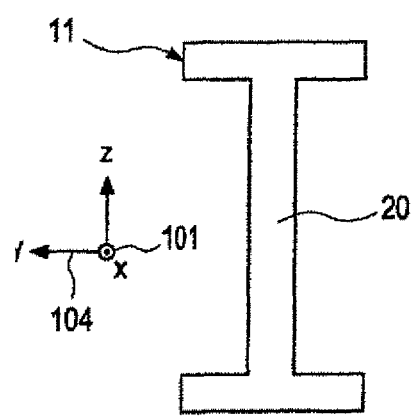

The aforedescribed support member 11 (FIG. 9) may be designed, for example, as a beam having an I-shaped cross-section, which is preferably arranged such that a central web 20 forming the I-shaped beam is oriented along the vehicle's vertical direction (z-axis), in order to achieve a high rigidity of the support member 11 for forces in the z direction, while having only a low rigidity or a relatively lower rigidity for forces in the y-direction.

The invention claimed is:

1. A device for generating an impulse acting on a vehicle in a vehicle's transverse direction as a result of energy released during an offset collision of the vehicle with an obstacle, comprising:
    at least one rigid compression-resistant beam extending in the vehicle's transverse direction,
    at least one support member for attaching the at least one beam in a rest position to a subframe or to a body structure of the vehicle,
    at least an actuator for displacing the beam substantially in the vehicle's transverse direction in the event of a collision, and
    at least one coupling device, which cooperates or is operatively connected, at least when the beam is displaced in the vehicle's transverse direction, with an aggregate and deflects the aggregate relative to the body of the vehicle in the vehicle's transverse direction at least in a region of an operative connection,
    wherein the at least one coupling device is located in a middle area of the beam spaced from opposite ends of the beam as considered in the vehicle's transverse direction.

2. The device of claim 1, wherein the at least one support member is constructed for articulation about a vehicle's vertical axis or is less resistant to deformation about the vehicle's vertical axis than about other vehicle axes.

3. The device of claim 1, wherein the at least one support member is constructed as an articulated device, or as at least one of a deformation component and a deformation assembly.

4. The device of claim 1, wherein the at least one coupling device cooperates with the aggregate in a region where a spatial axis extends through a center of gravity.

5. The device of claim 1, wherein the at least one coupling device supports, during normal operation of the vehicle, the aggregate in a vertical direction of the vehicle body, such that the beam operates as a torque cross beam for supporting moments about the vehicle's transverse axis.

6. The device of claim 1, wherein the at least one actuator, as viewed in the vehicle's transverse direction, is arranged at least partially outside a vehicle's longitudinal rail and protrudes outwardly in the vehicle's transverse direction so far so as to displace the beam in the vehicle's transverse direction in the event of a collision.

7. The device of claim 1, wherein the actuator is composed of end-side rounded portions or chamfers of the beam.

8. The device of claim 1, wherein the beam and the aggregate are decoupled during normal operation of the vehicle.

9. The device of claim 1, wherein in a partially overlapping collision test, the aggregate comes into contact with the body structure of the vehicle on a side facing away from a side of the impact.

10. The device of claim 1, wherein the device is arranged in a front region or a rear region of the vehicle.

11. The device of claim 1, wherein the at least one coupling device includes a cup-shaped recess in which a projection engages so that a play between the at least one coupling device and the projection is provided in the vehicle's transverse direction in a normal state so as to prevent movement of the aggregate in the vehicle's transverse direction from being inadvertently transmitted to the device.

* * * * *